Feb. 7, 1928.　　　　　　　　1,658,064
S. B. STINE
METHOD OF MAKING SCREENS
Filed June 25, 1926　　　2 Sheets-Sheet 1
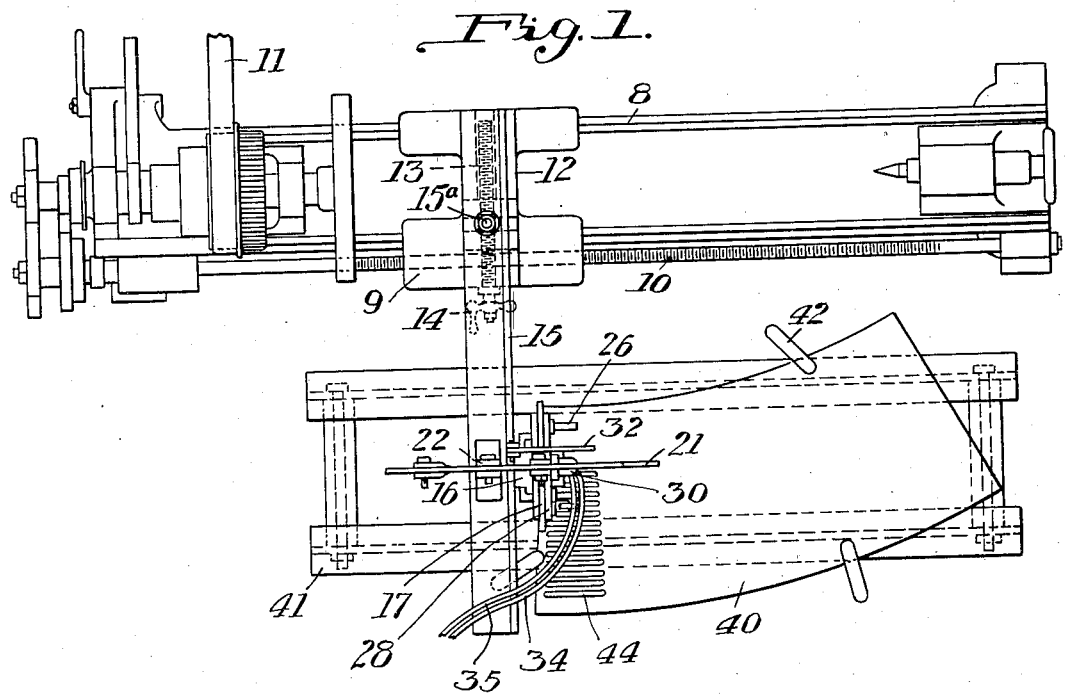
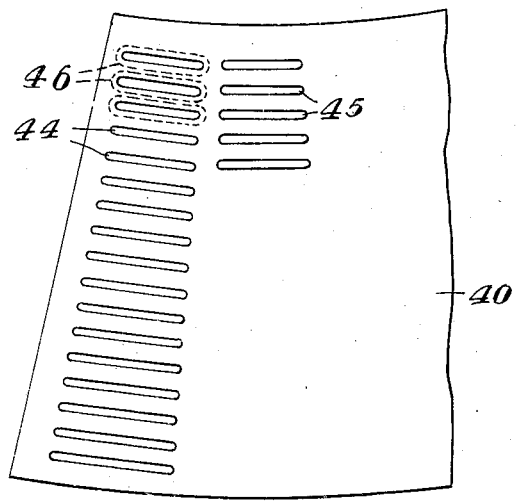
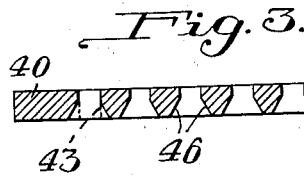
INVENTOR
Samuel Blaine Stine
By Archworth Martin,
Attorney.

Feb. 7, 1928.
S. B. STINE
1,658,064
METHOD OF MAKING SCREENS
Filed June 25, 1926  2 Sheets-Sheet 2
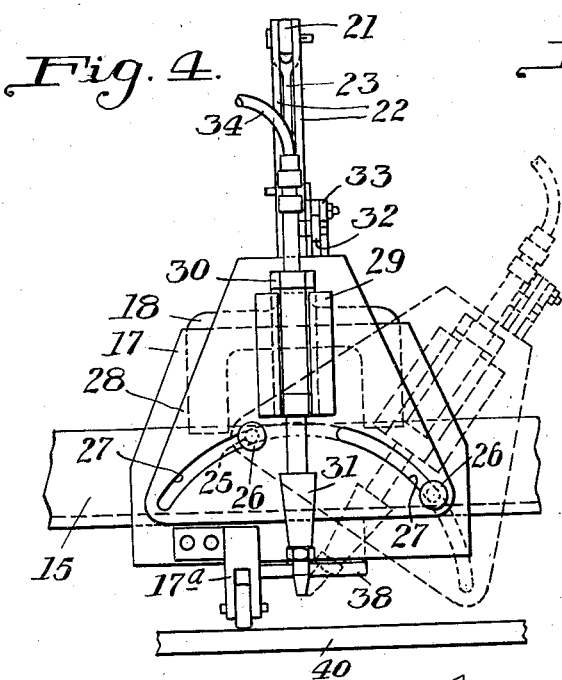
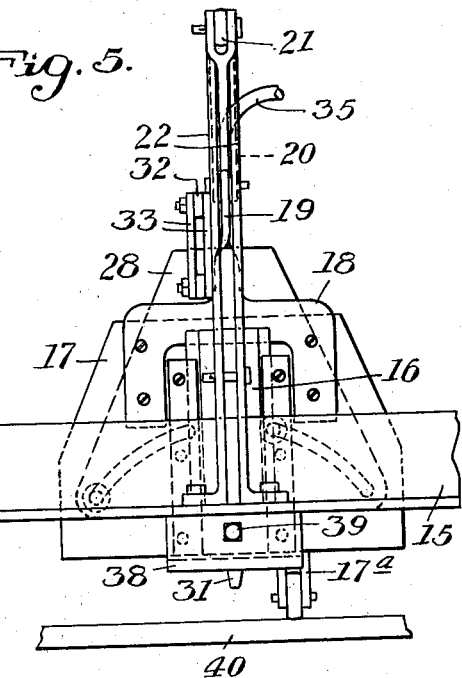
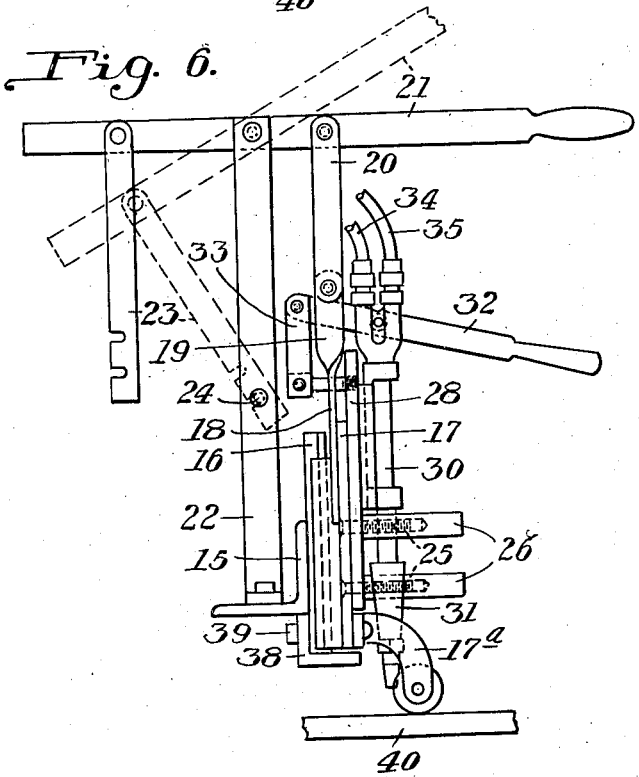
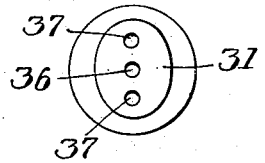
INVENTOR
Samuel Blaine Stine
By Archworth Martin,
Attorney Patented Feb. 7, 1928.

1,658,064

UNITED STATES PATENT OFFICE.

SAMUEL BLAINE STINE, OF OSCEOLA MILLS, PENNSYLVANIA.

METHOD OF MAKING SCREENS.

Application filed June 25, 1926. Serial No. 118,506.

My invention relates to a method and apparatus for forming metal screens, such as are employed in the separation of the finer particles of a volume of clay, crushed shale, or the like, from the coarser particles thereof.

Screens for materials of this kind have heretofore been made of two forms, one form being of cast metal and having ribs of triangular shape, whose apices terminate adjacent to the bottom surface of the screen, so that they do not clog easily, and the other form comprising plates that are pierced by punches to provide screen openings.

In the case of ribbed screens, whose ribs have their bases uppermost, when the tops or bases of the triangular ribs have become worn away to only a small extent, the slots are thereby so widened that relatively coarse material will pass therethrough and the plates therefor discarded frequently.

In the case of the punched plates, relatively thin plates have to be employed because the thickness of the plate which it is possible to punch is governed by the width of the slot desired. For instance, a punch designed for forming a slot $\frac{1}{16}$ inch in width cannot pierce a plate having a thickness substantially greater than $\frac{1}{16}$ of an inch. In other words, a punch will not properly pierce a plate of greater thickness than the width of the punch.

One object of my invention is to provide a means and a method whereby narrow slots may be formed in a relatively thick plate.

While my invention is shown and described as employed in connection with the formation of screen plates, it is susceptible of usage in various other relations.

One form which my invention may take is shown in the accompanying drawing wherein Figure 1 is a plan view of apparatus embodying my invention; Figs. 2 and 3 are plan and sectional views respectively of a portion of a plate, showing the manner in which the perforations or slots appear in the finished plate after the same has been subjected to a cutting operation by the torch of Fig. 1; Fig. 4 is a front elevational view of a portion of the apparatus of Fig. 1; Fig. 5 is a rear elevational view thereof; Fig. 6 is a side elevational view, and Fig. 7 is a bottom plan view, on an enlarged scale, of the burner tip which I employ.

The apparatus as shown in Fig. 1 is employed in connection with a lathe that may be of conventional form, and which is provided with means for imparting longitudinal and lateral movements to the cutting apparatus. The lathe is provided with the usual guide-ways 8 which support a carriage 9 that is advanced longitudinally of the lathe bed by a feed screw 10, which is driven from a belt 11, through transmission gearing which is of conventional form and will therefore require no detailed description. The belt 11 is driven from a line shaft or other source of power (not shown). The carriage 8 supports a slide block 12 that may be moved transversely of the lathe carriage by a cross feed screw 13 to which a handle 14 is connected. This cross feed may be of a type commonly found in various makes of lathes.

An angle bar 15 is secured to the block 12 by a bolt 15ᵃ and supports a cutting apparatus which will now be described. A grooved guide block 16 is secured to the angle bar 15 and slidably supports a slide plate 17 that has flanges fitting within the groove block 16. A yoke 18 has its lower ends secured to the slide plate 17 and is provided with an extended portion 19 that has pivotal connection with the lower end of a link 20. The upper end of the link 20 is pivotally connected to a hand lever 21 that is pivotally mounted upon a post 22, whose lower end is bolted to the angle bar 15. A latch bar 23 is pivotally supported from the rear end of the hand lever 21, and has notches for engagement with a bolt or pin 24, so that the hand lever 21 may be held in various set positions, as indicated in Fig. 6 by dotted lines. It will be seen that the hand lever 21 may be oscillated about its pivot to raise and lower the slide plate 17.

The plate 17 has screw-threaded holes for the reception of studs 25 to which handles 26 are secured. The studs 25 extend through arcuate slots 27 in a plate 28 and support such plate. By turning the handles 26 they may be caused to serve as clamps for holding the plate 28 tightly against the plate 17 and maintaining the same in various adjusted positions as indicated in Fig. 4 by dotted lines, so that the torch which is carried by the plate 28 may be given a desired cutting angle with respect to the screen plate being operated upon.

A slide-way 29 is bolted to the plate 28 and slidably supports a torch bracket 30. The bracket 30 carries a torch 31. A lever 32 has pin-and-slot connection with the torch bracket 30 and at its rear end is pivotally supported upon a link 33 that is in turn pivotally connected to the laterally adjustable plate 28. Hose connections 34 and 35 are provided for conducting oxygen and acetylene gas to the torch or burner 31, the oxygen being preferably connected to the middle hole 36 of the burner, and the acetylene to the hole 37. The holes are arranged in a straight line, so that narrow slots may be burned or cut into plates that are operated upon. An angle 38 is provided for limiting downward movement of the slide plate 17 and may be adjustably secured to the guide block 16 by a screw 39.

The plates which are to be slotted to form screens, as indicated by the reference numeral 40, are of segmental shape so that they may be assembled to form a circular screen upon which stone or other material may be screened after being ground by crushing wheels (not shown). The apparatus is shown as particularly designed for cutting symmetrically arranged uniform slots in screens of this character.

A table or rack 41, shown as composed of metal bars, is provided for supporting the plates, the plates being secured thereto by clamps 42. The slide plates 17, burner supporting plate 28 and the burner, are all movable as a unit, by means of the hand lever 21, by means of which a general adjustment of the burning apparatus may be effected. Finer adjustments of the burner are effected by means of the hand lever 32. In the drawings, the torch 31 is shown in full line position for cutting slots having vertical walls, as indicated by the dotted lines 43 in Fig. 3. In cutting a row of holes 44, the cross feed block 12 is so positioned upon the lathe carriage 9 that the burner tip will be adjacent to one edge of the plate 40, whereupon the carriage 9 is moved forwardly to cause the torch to burn a slot of the desired length. A bracket 17ª is secured to the plate 17 and carries a guide roller that engages the plate to be cut.

The handle 14 is then turned to shift the torch radially of the plate so that another slot can be cut, these turns being repeated until a row of slots 44 have been cut. Succeeding rows of slots 45 are then cut, the plate being shifted at the completion of each row so that the slots of a given row will extend tangentially of the plate 40 and at a slight angle to the slots of the previous row. When the desired number of slots have been cut in the plate, the plate is then turned upside down upon the table 41 and the operations above described are repeated, but with the torch adjusted to such angles that one corner of each slot wall is cut away, to produce a bevelled effect, as indicated by the reference numeral 46 in Fig. 3, which shows the plate turned right side up after the last cutting operation and in the position which it occupies in an assembled screen.

In order to produce the proper bevelling effect, I have found it desirable when the torch is inclined, to reduce the supply of fuel, thereby preventing excessive cutting away of the plate. A reduced cutting effect would also be secured by speeding up the movement of the torch carrier, or by moving the torch away from the plate for a slightly greater distance than in the cutting of the vertical slot, but in the latter case the bevelling would not be so accurate as where the torch is closer to the plate and the supply of fuel reduced.

The walls of the slots are flared downwardly and thus reduce the tendency of the plate to become clogged when in service. Furthermore, the plates can be subjected to considerable wear and consequent reduction in thickness, before it becomes necessary to replace the same; this by reason of the fact that the walls of the openings are vertically parallel for a considerable distance below the top surfaces of the plates.

I claim as my invention:

1. The method of perforating metal plates, which comprises applying a cutting flame to a plate in a direction perpendicular to the plane of the plate and thereafter applying the flame to the plate in an oblique direction, to cut away a portion of one wall of the perforation.

2. The method of forming screen plates, which comprises piercing such plates in a direction perpendicular to the plane of the plate, and cutting away a portion of the wall of the perforation at the bottom surface of the plate.

3. The method of forming screen plates, which comprises applying a cutting flame to a metal plate in a direction perpendicular to the plane of the plate, to pierce the same, and thereafter applying the cutting flame thereto in oppositely disposed angular directions, to enlarge the opening at one side of the plate.

4. The method of perforating metal plates which comprises applying a cutting element to a plate in a direction perpendicular to the plane of the plate, to form a perforation having vertical walls, and cutting away a portion of one wall at one side of the plate for a distance materially less than the thickness of the plate.

5. The method of perforating metal plates of generally sector form, which comprises imparting relative movement to a cutting element and a plate, in directions parallel to tangents of said plate, shifting the relative positions of the cutting element and the plate in a direction radially of the plate, between the cutting operations, and thereafter causing the cutting element to operate upon the plate from a different angle than that at which it previously operated, to cut away a portion of one wall of each perforation.

6. The method of forming screen plates having elongated openings, which comprises applying a cutting flame to a plate in a direction perpendicular to the plane of the plate, to form a perforation having vertical walls, moving the cutting flame while perpendicular in a direction parallel to the plane of the plate for a distance sufficient to cut a perforation of the length desired, thereafter inclining said flame and moving it in a direction parallel to the first-named direction to cut away a portion of the slot wall at one side of the plate for a distance materially less than the thickness of the plate.

In testimony whereof I, the said SAMUEL BLAINE STINE, have hereunto set my hand.

SAMUEL BLAINE STINE.